(12) United States Patent
Jeong et al.

(10) Patent No.: US 12,441,826 B2
(45) Date of Patent: Oct. 14, 2025

(54) METHOD OF PREPARING VINYL CYANIDE COMPOUND-CONJUGATED DIENE RUBBER-AROMATIC VINYL COMPOUND GRAFT COPOLYMER, METHOD OF PREPARING THERMOPLASTIC RESIN COMPOSITION INCLUDING THE SAME, AND THERMOPLASTIC RESIN COMPOSITION INCLUDING THE SAME

(71) Applicant: LG CHEM, LTD., Seoul (KR)

(72) Inventors: Young Hwan Jeong, Daejeon (KR); Jaemin Suk, Daejeon (KR); Young Min Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 889 days.

(21) Appl. No.: 17/642,071

(22) PCT Filed: Aug. 19, 2021

(86) PCT No.: PCT/KR2021/010997
§ 371 (c)(1),
(2) Date: Mar. 10, 2022

(87) PCT Pub. No.: WO2022/075578
PCT Pub. Date: Apr. 14, 2022

(65) Prior Publication Data
US 2022/0411558 A1     Dec. 29, 2022

(30) Foreign Application Priority Data

Oct. 8, 2020 (KR) ......................... 10-2020-0130030
Oct. 8, 2020 (KR) ......................... 10-2020-0130031
Jul. 30, 2021 (KR) ......................... 10-2021-0100526

(51) Int. Cl.
C08L 25/12     (2006.01)
C08F 279/04   (2006.01)

(52) U.S. Cl.
CPC ............ C08F 279/04 (2013.01); C08L 25/12 (2013.01)

(58) Field of Classification Search
CPC .. C08L 55/02; C08F 6/003; C08F 6/18; C08F 136/06; C08F 2/24; C08F 279/04; C08F 212/10; C08F 220/44
See application file for complete search history.

(56) References Cited

U.S. PATENT DOCUMENTS 4,080,352 A     3/1978  Wallace
5,367,021 A *  11/1994 Roovers ................. C08L 69/00
                                                           525/67

(Continued)

FOREIGN PATENT DOCUMENTS

CN     110914319 A    3/2020
CN     110997804 A    4/2020

(Continued)

OTHER PUBLICATIONS

Extended European Search Report (EESR) dated Jun. 14, 2023 from the EPO corresponding European Patent Application No. 21856951.5.

(Continued)

*Primary Examiner* — Mark S Kaucher
(74) *Attorney, Agent, or Firm* — Morgan, Lewis & Bockius LLP

(57) ABSTRACT

Disclosed is a method of preparing a vinyl cyanide compound-conjugated diene rubber-aromatic vinyl compound graft copolymer, a method of preparing a thermoplastic resin composition including the same, and a thermoplastic resin composition including the same. More specifically, when a conjugated diene compound and a molecular weight regulator are fed in a split manner during polymerization of conjugated diene rubber, and the content of an emulsifier is reduced, gel content may be reduced. In addition, when (Continued)

enlarged conjugated diene-based rubber latex is prepared by enlarging conjugated diene-based rubber latex using an acid enlarging agent, the enlarged conjugated diene-based rubber latex may have an expanded full width at half maximum in particle size distribution, thereby improving gloss, reflection haze, fluidity, and impact resistance. In addition, deposits may be reduced during injection molding.

9 Claims, 1 Drawing Sheet

(56) References Cited

U.S. PATENT DOCUMENTS

| | | |
|---|---|---|
| 2003/0018125 A1 | 1/2003 | Yoo et al. |
| 2014/0100316 A1 | 4/2014 | Washizu |
| 2016/0137830 A1 | 5/2016 | Ahn et al. |
| 2017/0198132 A1 | 7/2017 | Choi et al. |
| 2020/0140597 A1 | 5/2020 | Jeon et al. |
| 2020/0231799 A1 | 7/2020 | Lee et al. |
| 2020/0407478 A1 | 12/2020 | Chai et al. |
| 2021/0230334 A1* | 7/2021 | Suk .................. C08F 279/04 |

FOREIGN PATENT DOCUMENTS

| | | |
|---|---|---|
| CN | 111117096 A | 5/2020 |
| EP | 2157129 A1 | 2/2010 |
| EP | 3363819 A1 | 8/2018 |
| EP | 3626754 A1 | 3/2020 |
| JP | 2014-088544 A | 5/2014 |
| KR | 2000-0034196 A | 6/2000 |
| KR | 2002-0003434 A1 | 1/2002 |
| KR | 10-2002-0039854 A | 5/2002 |
| KR | 10-0409071 B1 | 12/2003 |
| KR | 10-2004-0049494 A | 6/2004 |
| KR | 10-0527095 B1 | 11/2005 |
| KR | 10-0530999 B1 | 11/2005 |
| KR | 10-2010-0038700 A | 4/2010 |
| KR | 10-1530150 B1 | 6/2015 |
| KR | 10-1533136 B1 | 7/2015 |
| KR | 10-2017-0067982 A | 6/2017 |
| KR | 10-2019-0095880 A | 8/2019 |
| KR | 10-2019-0096683 A | 8/2019 |
| KR | 10-2020-0005093 A | 1/2020 |
| KR | 10-2020-0037979 A | 4/2020 |
| KR | 10-2020-0073981 A | 6/2020 |
| WO | 2016-052832 A1 | 4/2016 |

OTHER PUBLICATIONS

International Search Report and Written Opinion issued in corresponding International Patent Application No. PCT/KR2021/010997 , dated Nov. 30, 2021.

First Office dated Sep. 1, 2023 from the CNIPA corresponding Chinese Patent Application No. 202180005520.X. Note: KR 10-2020-0005093 cited therein is already of record.

* cited by examiner

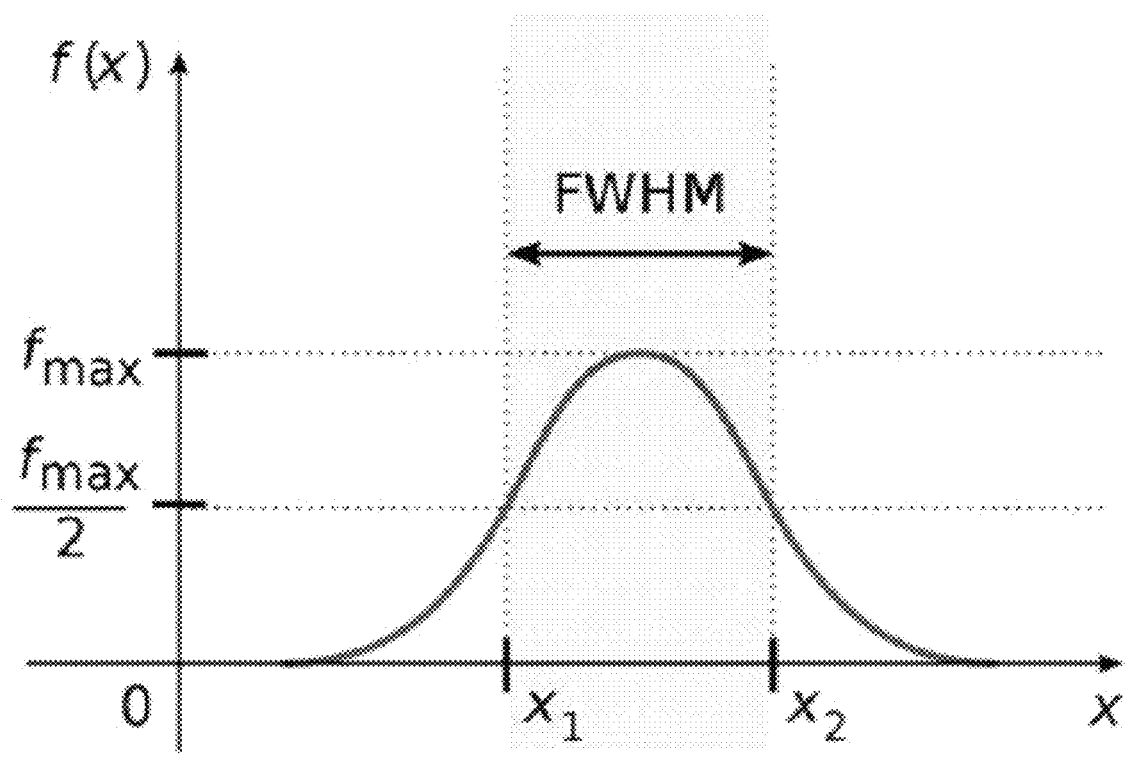

METHOD OF PREPARING VINYL CYANIDE COMPOUND-CONJUGATED DIENE RUBBER-AROMATIC VINYL COMPOUND GRAFT COPOLYMER, METHOD OF PREPARING THERMOPLASTIC RESIN COMPOSITION INCLUDING THE SAME, AND THERMOPLASTIC RESIN COMPOSITION INCLUDING THE SAME

TECHNICAL FIELD

Cross-Reference to Related Applications

The present application is a U.S. National Stage of PCT/KR2021/010997, filed on Aug. 19, 2021, which claims priority to Korean Patent Application No. 10-2020-0130030, filed on Oct. 8, 2020, Korean Patent Application No. 10-2020-0130031, filed on Oct. 8, 2020, and Korean Patent Application No. 10-2021-0100526, re-filed on Jul. 30, 2021, based on the priority of Korean Patent Application No. 10-2020-0130030, in the Korean Intellectual Property Office, the disclosures of each of which are incorporated herein by reference.

The present invention relates to a method of preparing a vinyl cyanide compound-conjugated diene rubber-aromatic vinyl compound graft copolymer, a method of preparing a thermoplastic resin composition including the same, and a thermoplastic resin composition including the same. More specifically, according to the present invention, by reducing the gel content of conjugated diene rubber latex and enlarging the conjugated diene rubber latex using an acid enlarging agent, the conjugated diene rubber latex has an expanded full width at half maximum in particle size distribution. Accordingly, a vinyl cyanide compound-conjugated diene rubber-aromatic vinyl compound graft copolymer including the conjugated diene rubber latex may have excellent appearance properties, such as gloss and reflection haze, fluidity, and impact resistance. In addition, injection deposits may be reduced during injection molding.

BACKGROUND ART

Acrylonitrile-butadiene-styrene (hereinafter referred to as "ABS") copolymers have good mechanical strength, such as impact resistance, and physical properties, such as moldability and gloss, and thus have been used in various fields such as electric/electronic parts, office equipment, and automobile parts.

In general, when an ABS copolymer is prepared by grafting styrene and acrylonitrile onto butadiene rubber latex using an emulsion polymerization method, compared to an ABS copolymer prepared by bulk polymerization, good physical property balance and excellent gloss can be secured. Accordingly, ABS copolymers are mainly prepared by emulsion polymerization.

In addition, an ABS copolymer prepared as described above is mixed with a styrene-acrylonitrile (hereinafter referred to as "SAN") copolymer, and is subjected to a thermoforming process to produce a final product. The gloss and impact resistance of a thermoplastic resin composition prepared as described above are affected by the gel content and particle size distribution of a dispersed rubber polymer. In addition, when the thermoplastic resin composition is subjected to a high-temperature injection process, an emulsifier, and the like remaining in butadiene rubber remains as deposits in an injection mold. These deposits cause product defects, and to perform a cleaning process to remove the deposits, a production process must be temporarily stopped. Thus, the deposits affect productivity.

Therefore, there is increasing demand for a method of preparing an ABS copolymer capable of further improving the impact strength of an ABS copolymer and appearance, such as gloss, and increasing productivity by reducing deposits during injection molding.

[Related Art Documents]
[Patent Documents]
KR 0527095 B1

DISCLOSURE

Technical Problem

Therefore, the present invention has been made in view of the above problems, and it is one object of the present invention to provide a method of preparing a vinyl cyanide compound-conjugated diene rubber-aromatic vinyl compound graft copolymer, a method of preparing a thermoplastic resin composition including the same, and a thermoplastic resin composition including the same. According to the present invention, the vinyl cyanide compound-conjugated diene rubber-aromatic vinyl compound graft copolymer may have excellent fluidity, reflection haze, and gloss, and the impact resistance thereof may be further improved. In addition, mold deposits may be reduced during injection molding. Thus, the graft copolymer of the present invention may be applied to fields requiring impact resistance, gloss, processability, and high quality.

The above and other objects can be accomplished by the present invention described below.

Technical Solution

In accordance with one aspect of the present invention, provided is a method of preparing a vinyl cyanide compound-conjugated diene rubber-aromatic vinyl compound graft copolymer, the method including step (a) of adding 0.1 to 2 parts by weight of an emulsifier, 0.1 to 0.4 parts by weight of an electrolyte, and a molecular weight regulator to 20 to 40 parts by weight of 100 parts by weight in total of a conjugated diene compound and performing polymerization; step (b) of adding, after step (a), the remaining conjugated diene compound and a molecular weight regulator and performing polymerization to obtain conjugated diene rubber latex; step (c) of preparing enlarged conjugated diene rubber latex by adding 0.3 to 1.1 parts by weight of an acid enlarging agent to 100 parts by weight (based on solids) of the conjugated diene rubber latex to enlarge the conjugated diene rubber latex; and step (d) of graft-polymerizing 40 to 70% by weight (based on solids) of the enlarged conjugated diene rubber latex, 15 to 45% by weight of an aromatic vinyl compound, and 5 to 25% by weight of a vinyl cyanide compound to obtain a vinyl cyanide compound-conjugated diene rubber-aromatic vinyl compound graft copolymer, wherein the enlarged conjugated diene rubber latex obtained in step (c) has an average particle diameter of 2,800 to 3,800 A and a full width at half maximum of 1,400 to 2,700 A in particle size distribution.

In addition, the present invention may provide a method of preparing a vinyl cyanide compound-conjugated diene rubber-aromatic vinyl compound graft copolymer, the method including step (a) of adding 0.1 to 2 parts by weight of an emulsifier, 0.1 to 0.4 parts by weight of an electrolyte, and a molecular weight regulator to 20 to 40 parts by weight of 100 parts by weight in total of a conjugated diene compound and performing polymerization; step (b) of adding, after step (a), the remaining conjugated diene compound and a molecular weight regulator and performing polymerization to obtain conjugated diene rubber latex; step (b') of adding, after step (b), 0.05 to 0.2 parts by weight of an electrolyte to 100 parts by weight (based on solids) of the conjugated diene rubber latex; step (c) of preparing enlarged conjugated diene rubber latex by adding 0.3 to 1.1 parts by weight of an acid enlarging agent to 100 parts by weight (based on solids) of the conjugated diene rubber latex to enlarge the conjugated diene rubber latex; and step (d) of graft-polymerizing 40 to 70% by weight (based on solids) of the enlarged conjugated diene rubber latex, 15 to 45% by weight of an aromatic vinyl compound, and 5 to 25% by weight of a vinyl cyanide compound to obtain a vinyl cyanide compound-conjugated diene rubber-aromatic vinyl compound graft copolymer, wherein the enlarged conjugated diene rubber latex obtained in step (c) has an average particle diameter of 2,800 to 3,800 Å and a full width at half maximum of 1,400 to 2,700 Å in particle size distribution.

In accordance with another aspect of the present invention, provided is a method of preparing a thermoplastic resin composition, the method including preparing the vinyl cyanide compound-conjugated diene rubber-aromatic vinyl compound graft copolymer according to the above-described preparation method; and feeding 15 to 35% by weight of the prepared graft copolymer and 65 to 85% by weight of an aromatic vinyl compound-vinyl cyanide compound copolymer into an extruder, performing melt-kneading, and then performing extrusion.

In accordance with still another aspect of the present invention, provided is a thermoplastic resin composition including 15 to 35% by weight of a vinyl cyanide compound-conjugated diene rubber-aromatic vinyl compound graft copolymer and 65 to 85% by weight of an aromatic vinyl compound-vinyl cyanide compound copolymer, wherein the conjugated diene rubber has an average particle diameter of 2,800 to 3,800 Å and a full width at half maximum of 1,400 to 2,700 Å in particle size distribution, and the thermoplastic resin composition has an Izod impact strength of 40 kgf·cm/cm or more as measured using a specimen having a thickness of ⅛" according to ASTM D256.

In addition, the present invention may provide a thermoplastic resin composition including 15 to 35% by weight of a vinyl cyanide compound-conjugated diene rubber-aromatic vinyl compound graft copolymer and 65 to 85% by weight of an aromatic vinyl compound-vinyl cyanide compound copolymer, wherein the conjugated diene rubber has an average particle diameter of 2,800 to 3,800 Å and a full width at half maximum of 1,400 to 2,700 Å in particle size distribution, and when 100 kg of a resin is injected in a cycle of 30 seconds at a cylinder temperature of 230° C. and a mold temperature of 25° C. using an injection machine (ENGEL Co., clamping force: 150 tons), an amount of injection mold deposits remaining on a plate of is 93 mg or less.

In addition, the present invention may provide a thermoplastic resin composition including 15 to 35% by weight of a vinyl cyanide compound-conjugated diene rubber-aromatic vinyl compound graft copolymer and 65 to 85% by weight of an aromatic vinyl compound-vinyl cyanide compound copolymer, wherein the conjugated diene rubber has an average particle diameter of 2,800 to 3,800 Å and a full width at half maximum of 1,400 to 2,700 Å in particle size distribution, and when 100 kg of a resin is injected in a cycle of 30 seconds at a cylinder temperature of 220° C. and a mold temperature of 30° C. using an injection machine (VICTORY, ENGEL Co., clamping force: 150 tons), in a case of the thermoplastic resin composition, an amount of injection mold deposits remaining on a plate is 93 mg or less.

In accordance with yet another aspect of the present invention, provided is a molded article including the thermoplastic resin composition.

Advantageous Effects

The present invention has an effect of providing a method of preparing a vinyl cyanide compound-conjugated diene rubber-aromatic vinyl compound graft copolymer, a method of preparing a thermoplastic resin composition including the same, and a thermoplastic resin composition including the same. According to the present invention, the vinyl cyanide compound-conjugated diene rubber-aromatic vinyl compound graft copolymer can have excellent fluidity, reflection haze, and gloss, and the impact resistance thereof is excellent compared to conventional ABS resins. In addition, mold deposits can be reduced during injection molding. Thus, due to excellent productivity and quality thereof, the graft copolymer of the present invention can be applied to fields requiring impact resistance, gloss, and processability.

DESCRIPTION OF DRAWINGS

FIG. 1 is a drawing for explaining full width at half maximum in particle size distribution.

BEST MODE

Hereinafter, a method of preparing a vinyl cyanide compound-conjugated diene rubber-aromatic vinyl compound graft copolymer, a method of preparing a thermoplastic resin composition including the same, and a thermoplastic resin composition including the same according to the present invention will be described in detail.

The present inventors confirmed that, when a method of inputting a conjugated diene compound and a molecular weight regulator was changed during polymerization of conjugated diene rubber and the contents of an emulsifier and an electrolyte were reduced to predetermined contents, gel content was reduced. In addition, when enlarged conjugated diene rubber was prepared by enlarging the conjugated diene rubber using an acid enlarging agent in a predetermined amount, the enlarged conjugated diene rubber had an expanded full width at half maximum in particle size distribution, thereby exhibiting excellent appearance properties, such as reflection haze and gloss. In addition, impact strength was significantly improved, and mold deposits were reduced during injection. Based on these results, the present inventors conducted further studies to complete the present invention.

The method of preparing a vinyl cyanide compound-conjugated diene rubber-aromatic vinyl compound graft copolymer according to the present invention includes step (a) of adding 0.1 to 2 parts by weight of an emulsifier, 0.1 to 0.4 parts by weight of an electrolyte, and a molecular weight regulator to 20 to 40 parts by weight of 100 parts by weight in total of a conjugated diene compound and performing polymerization; step (b) of adding, after step (a), the remaining conjugated diene compound and a molecular weight regulator and performing polymerization to obtain conjugated diene rubber latex; step (c) of preparing enlarged conjugated diene rubber latex by adding 0.3 to 1.1 parts by weight of an acid enlarging agent to 100 parts by weight (based on solids) of the conjugated diene rubber latex to enlarge the conjugated diene rubber latex; and step (d) of graft-polymerizing 40 to 70% by weight (based on solids) of the enlarged conjugated diene rubber latex, 15 to 45% by weight of an aromatic vinyl compound, and 5 to 25% by weight of a vinyl cyanide compound to obtain a vinyl cyanide compound-conjugated diene rubber-aromatic vinyl compound graft copolymer, wherein the enlarged conjugated diene rubber latex obtained in step (c) has an average particle diameter of 2,800 to 3,800 Å and a full width at half maximum of 1,400 to 2,700 Å in particle size distribution. In this case, fluidity, reflection haze, and gloss may be excellent, and impact resistance may be significantly improved, compared to conventional ABS resins. In addition, mold deposits may be significantly reduced during injection molding.

Hereinafter, each step of the method of preparing a vinyl cyanide compound-conjugated diene rubber-aromatic vinyl compound graft copolymer according to the present invention will be described in detail.

a) Step of Adding 0.1 to 2 Parts by Weight of an Emulsifier, 0.1 to 0.4 Parts by Weight of an Electrolyte, and a Molecular Weight Regulator to 20 to 40 Parts by Weight of 100 Parts by Weight in Total of a Conjugated Diene Compound and Performing Polymerization In step (a), the emulsifier is preferably included in an amount of 0.3 to 1.7 parts by weight, more preferably 0.5 to 1.5 parts by weight, still more preferably 0.7 to 1.5 parts by weight, still more preferably 0.9 to 1.2 parts by weight. Within this range, impact resistance may be improved, and deposits may be reduced during injection molding, resulting in excellent productivity and appearance.

When polymerizing conventional conjugated diene rubber latex, based on 100 parts by weight of a conjugated diene compound, an emulsifier is added in an amount of 3 parts by weight or more for smooth polymerization. During injection molding, a large amount of residual emulsifier volatilized at high temperature is attached to a mold as deposits, causing decrease in productivity and poor appearance of a product. To solve these problems, according to the present invention, a conjugated diene compound and a molecular weight regulator are separately fed at the start of reaction and after polymerization is performed at 50 to 60° C. for 50 to 70 minutes. Thus, even when the amount of an emulsifier is greatly reduced, impact resistance, fluidity, reflection haze, and gloss may be excellent. In addition, injection mold deposits may be significantly reduced during injection molding.

In step (a), for example, the emulsifier may include one or more selected from the group consisting of docusate sodium, allyl aryl sulfonates, alkali methyl alkyl sulfonates, sulfonated alkyl esters, fatty acid soap, and rosin acid alkali salts, preferably fatty acid soap. In this case, impact resistance may be improved, and deposits may be reduced during injection molding, resulting in excellent productivity and appearance.

In step (a), for example, the molecular weight regulator may be included in an amount of 0.05 to 0.3 parts by weight, preferably 0.1 to 0.25 parts by weight, more preferably 0.13 to 0.2 parts by weight. Within this range, gel content may be reduced, thereby improving impact resistance.

For example, the molecular weight regulator may be a mercaptan-based molecular weight regulator, preferably tert-dodecylmercaptan.

In step (a), for example, the electrolyte may include one or more selected from the group consisting of $K_2CO_3$, $Na_2SO_4$, $Na_3PO_4$, $NaH_2PO_4$, and $Na_2HPO_4$, preferably includes one or more selected from the group consisting of $K_2CO_3$, $Na_2SO_4$, and $Na_3PO_4$. In this case, gel content may be reduced, and enlarged conjugated diene rubber may have an expanded full width at half maximum in particle size distribution. As a result, impact resistance may be greatly increased, and fluidity, reflection haze, and gloss may be excellent.

In step (a), the electrolyte is preferably included in an amount of 0.2 to 0.4 parts by weight. Within this range, gel content may be reduced, and enlarged conjugated diene rubber may have an expanded full width at half maximum in particle size distribution. As a result, impact resistance may be greatly increased, and fluidity, reflection haze, and gloss may be excellent.

For example, in step (a), polymerization may be performed at 50 to 60° C. for 50 to 70 minutes, preferably at 53 to 57° C. for 55 to 65 minutes. In this case, gel content may be reduced, and enlarged conjugated diene rubber may have an expanded full width at half maximum in particle size distribution. As a result, impact resistance may be greatly increased, and fluidity, reflection haze, and gloss may be excellent.

For example, in step (a), 0.01 to 0.5 parts by weight of an oxidation-reduction catalyst, 0.01 to 0.7 parts by weight of a fat-soluble polymerization initiator, and 80 to 120 parts by weight of deionized water may be included and polymerized. Preferably, 0.05 to 0.3 parts by weight of an oxidation-reduction catalyst, 0.05 to 0.5 parts by weight of a fat-soluble polymerization initiator, and 90 to 110 parts by weight of deionized water are included and polymerized. Within this range, unreacted monomers may be reduced, thereby increasing the productivity of a vinyl cyanide compound-conjugated diene rubber-aromatic vinyl compound graft copolymer and improving the gloss and reflection haze of the copolymer.

For example, the oxidation-reduction catalyst may include one or more selected from the group consisting of sodium formaldehyde sulfoxylate, sodium ethylenediamine tetraacetate, ferrous sulfate, dextrose, sodium pyrophosphate, and sodium sulfite. Within this range, unreacted monomers may be reduced, thereby increasing the productivity of a vinyl cyanide compound-conjugated diene rubber-aromatic vinyl compound graft copolymer and improving the gloss and reflection haze of the copolymer.

For example, the fat-soluble polymerization initiator may include one or more selected from the group consisting of alkyl peroxides, aryl peroxides, and azonitriles.

Specifically, the fat-soluble polymerization initiator may include one or more selected from the group consisting of cumene hydroperoxide, diisopropyl benzene hydroperoxide, azobis isobutylonitrile, tert-butyl hydroperoxide, paramethane hydroperoxide, and benzoyl peroxide, preferably tert-butyl hydroperoxide.

b) Step of Adding, after Step (a), the Remaining Conjugated Diene Compound and a Molecular Weight Regulator and Performing Polymerization to Obtain Conjugated Diene Rubber Latex For example, in step (b), preferably, after step (a), the remaining conjugated diene compound and the molecular weight regulator are continuously added for 9 to 11 hours, and temperature is raised to 73 to 83° C. over 8 to 10 hours and maintained at 73 to 83° C. More preferably, the remaining conjugated diene compound and the molecular weight regulator are continuously added for 9.5 to 10.5 hours, and temperature is raised to 75 to 80° C. over 8.5 to 9.5 hours and maintained at 75 to 80° C. In this case, gel content and coagulum content may be reduced, and enlarged conjugated diene rubber may have an expanded full width at half maximum in particle size distribution. Thus, impact resistance may be significantly increased, and fluidity, reflection haze, and gloss may be excellent.

In this description, "continuous feed" means that components are not fed batchwise. For example, according to continuous feed, components may be fed for 10 minutes or more, 30 minutes or more, 1 hour or more, preferably 2 hours or more within a polymerization time range in drop by drop, little by little, step by step, or continuous flow.

More preferably, step (b) includes step (b-1) of continuously adding the remaining conjugated diene compound and the molecular weight regulator for 9 to 11 hours, raising temperature to 73 to 83° C. over 8 to 10 hours, and maintaining the temperature to perform polymerization; step (b-2) of adding 0.05 to 0.2 parts by weight of a water-soluble initiator and 0.05 to 0.3 parts by weight of an emulsifier when polymerization conversion rate is 30 to 40% and performing polymerization; and step (b-3) of terminating polymerization when polymerization conversion rate is 93 to 99%.

In step (b), for example, the molecular weight regulator may be included in an amount of 0.05 to 0.5 parts by weight, preferably 0.1 to 0.45 parts by weight, more preferably 0.2 to 0.4 parts by weight. Within this range, the coagulum content of conjugated diene rubber latex may be reduced, and the conjugated diene rubber latex may have an expanded full width at half maximum in particle size distribution, thereby securing excellent impact strength and fluidity.

The molecular weight regulator used in step (b) may be within the same range as that used in step (a).

In the present invention, by adding the conjugated diene compound and the molecular weight regulator in steps (a) and (b) in a split manner, even when the content of an emulsifier is reduced, polymerization of conjugated diene rubber latex may be efficiently performed, reducing gel content and coagulum content. Enlarged conjugated diene rubber latex obtained by enlarging the conjugated diene rubber latex may have an expanded full width at half maximum in particle size distribution, resulting in excellent impact resistance.

In this description, based on 100% of the total weight of monomers input until polymerization is completed, polymerization conversion rate may be defined as % by weight of the monomers converted into a polymer until measurement time. A method of measuring polymerization conversion rate is not particularly limited as long as the method follows this definition. As a specific example, after drying 1.5 g of prepared latex in a hot air dryer at 150° C. for 15 minutes, the weight of the dried latex is measured, and total solids content (TSC) is calculated by Equation 1 below. Then, polymerization conversion rate is calculated by substituting the total solids content value into Equation 2 below. In Equation 2, the total weight of added monomers is given as 100 parts by weight.

[Equation 1]

$$\text{Total solids content}(TSC;\%) = (\text{Weight after drying}/\text{Weight before drying}) \times 100$$

[Equation 2]

$$\text{Polymerization conversion rate }(\%) = [\text{Total solids content }(TSC) \times (\text{Total weight of added monomers, deionized water, and subsidiary raw materials})/100] - (\text{Weight of added subsidiary raw materials other than monomers and deionized water})$$

In Equation 2, subsidiary raw materials include an initiator, an emulsifier, and a molecular weight regulator.

In the case of polymerization of conjugated diene rubber latex, the added monomer refers to a conjugated diene compound. In the case of polymerization of vinyl cyanide compound-conjugated diene rubber-aromatic vinyl compound graft copolymer latex, the added monomers refer to a conjugated diene compound, a vinyl cyanide compound, and an aromatic vinyl compound.

In step (b-2), the water-soluble initiator is preferably included in an amount of 0.07 to 0.15 parts by weight. Within this range, unreacted monomers may be reduced, thereby increasing the productivity of a vinyl cyanide compound-conjugated diene rubber-aromatic vinyl compound graft copolymer and improving the gloss and reflection haze of the copolymer.

In step (b-2), for example, the water-soluble initiator may include one or more selected from the group consisting of hydrogen peroxide, potassium persulfate, sodium persulfate, and ammonium persulfate, preferably potassium persulfate.

In step (b-2), the emulsifier is preferably included in an amount of 0.1 to 0.25 parts by weight, more preferably 0.1 to 0.2 parts by weight. Within this range, gel content may be reduced, thereby improving impact resistance. In addition, mold deposits may be reduced during injection molding.

The emulsifier used in step (b-2) may be within the same range as that used in step (a).

For example, the conjugated diene rubber latex obtained in step (b) may have a gel content of 80% by weight or less, preferably 78% by weight or less, more preferably 70 to 78% by weight. Within this range, enlarged conjugated diene rubber may have an expanded full width at half maximum in particle size distribution, and thus impact resistance may be greatly increased. Thus, fluidity, reflection haze, and gloss may be excellent.

In this description, when gel content is measured, after rubber latex is coagulated using a dilute acid or a metal salt, the rubber latex is washed and dried in a vacuum oven at 60° C. for 24 hours. Then, the obtained rubber mass is chopped with scissors. Then, 1 g of rubber sections is placed in 100 g of toluene and placed in a dark room at room temperature for 48 hours. Then, the rubber is separated into a sol and a gel, and the gel content is calculated according to Equation 3 below.

[Equation 3]

$$\text{Gel content (\% by weight)} = [\text{Weight of insoluble matter (gel)}/\text{Weight of sample}] \times 100$$

For example, the conjugated diene rubber latex gobtained in step (b) may have an average particle diameter of 700 to 1,500 Å, preferably 800 to 1,400 Å, more preferably 1,000 to 1,300 Å. Within this range, gel content may be reduced, and enlarged conjugated diene rubber may have an expanded full width at half maximum in particle size distribution. Thus, impact resistance may be significantly increased, and fluidity, reflection haze, and gloss may be excellent.

In this description, average particle diameter may be measured by dynamic light scattering, and specifically, may be measured as an intensity value using a Nicomp 380 particle size analyzer (manufacturer: PSS) in a Gaussian mode. As a specific measurement example, a sample is prepared by diluting 0.1 g of latex (TSC: 35 to 50 wt %) 1,000 to 5,000-fold with distilled water, i.e., a sample is diluted appropriately so as not to deviate significantly from an intensity setpoint of 300 kHz, and is placed in a glass tube. Then, the average particle diameter of the sample is measured using a flow cell in auto-dilution in a measurement mode of dynamic light scattering/intensity 300 kHz/intensity-weight Gaussian analysis. At this time, setting values are as follows: temperature: 23° C.; measurement wavelength: 632.8 nm; and channel width: 10 psec.

For example, the conjugated diene rubber latex obtained in step (b) may have a coagulum content of 0.5% by weight or less, preferably 0.4% by weight or less, more preferably 0.35% by weight or less, still more preferably 0.05 to 0.35% by weight. Within this range, during injection molding, mold deposits may be reduced.

In this description, when measuring the content of coagulum in latex, after polymerization is completed, latex is filtered through a stainless steel mesh of 100 mesh size, and unfiltered coagulum is dried at 80° C. for 24 hours. After drying, the weight of the coagulum is measured. Then, the coagulum content is calculated as a percentage based on the total solids content.

For example, after step (b), step (b') of adding 0.05 to 0.2 parts by weight of an electrolyte to 100 parts by weight (based on solids) of the conjugated diene rubber latex may be included.

For convenience, 100 parts by weight (based on solids) of the conjugated diene rubber latex may be calculated as the total weight of a conjugated diene compound added during preparation of the conjugated diene rubber latex.

In step (b'), the amount of an electrolyte added to 100 parts by weight (based on solids) of the conjugated diene rubber latex is preferably 0.07 to 0.2 parts by weight, more preferably 0.07 to 0.17 parts by weight. Within this range, the conjugated diene rubber latex may be uniformly enlarged, and the content of an acid enlarging agent may be reduced, thereby reducing coagulum content.

In step (b'), preferably, an electrolyte is added to conjugated diene rubber latex, and stirring is performed. More preferably, an electrolyte is added to a conjugated diene rubber latex at 30 to 65° C., and stirring is performed at a stirring speed of 45 to 70 rpm for 10 to 30 minutes.

Still more preferably, an electrolyte is added to conjugated diene rubber latex at 35 to 60° C., and stirring is performed at a stirring speed of 50 to 65 rpm for 15 to 25 minutes. Within this range, the conjugated diene rubber latex may be uniformly enlarged, and coagulum content may be reduced. In addition, after enlarging, full width at half maximum in particle size distribution may be expanded.

For example, in step (b'), the electrolyte may include one or more selected from the group consisting of $K_2CO_3$, $Na_2SO_4$, $Na_3PO_4$, $NaH_2PO_4$, and $Na_2HPO_4$, preferably $Na_2SO_4$, $Na_2HPO_4$, or a mixture thereof. In this case, the conjugated diene rubber latex may be uniformly enlarged, and the amount of an acid enlarging agent used may be reduced. Thus, full width at half maximum in particle size distribution may be expanded, and coagulum content may be reduced.

For example, when step (b') is included, in step (a), the electrolyte is preferably $K_2CO_3$.

For example, when step (b') is not included, in step (a), the electrolyte preferably includes one or more selected from the group consisting of $Na_2SO_4$, $Na_3PO_4$, $NaH_2PO_4$, and $Na_2HPO_4$.

c) Step of Preparing Enlarged Conjugated Diene Rubber Latex by Adding 0.3 to 1.1 Parts by Weight of an Acid Enlarging Agent to 100 Parts by Weight (Based on Solids) of the Conjugated Diene Rubber Latex to Enlarge the Conjugated Diene Rubber Latex In step (c), based on 100 parts by weight (based on solids) of the conjugated diene rubber latex, an acid enlarging agent is preferably added in an amount of 0.5 to 1 part by weight, more preferably 0.6 to 0.9 parts by weight. Within this range, the conjugated diene rubber latex may be uniformly enlarged, and coagulum content may be reduced, thereby improving impact resistance.

When the acid enlarging agent includes a solvent such as water, the weight of the acid enlarging agent means weight excluding the solvent.

For example, the acid enlarging agent may include one or more selected from the group consisting of sulfuric acid, hydrochloric acid, formic acid, and acetic acid, preferably acetic acid. In this case, uniform enlarging is possible, coagulation efficiency may be good, and coagulum content may be reduced.

For example, the enlarged conjugated diene rubber latex obtained in step (c) may have an average particle diameter of 2,800 to 3,800 Å and a full width at half maximum of 1,400 to 2,700 Å in particle size distribution, preferably has an average particle diameter of 2,900 to 3,700 Å and a full width at half maximum of 1,500 to 2,700 Å in particle size distribution, more preferably has an average particle diameter of 3,000 to 3,600 Å and a full width at half maximum of 1,600 to 2,600 Å in particle size distribution. Within this range, impact resistance may be significantly improved, fluidity, reflection haze, and gloss may be excellent, and injection mold deposits may be reduced during injection molding.

In this description, the full width at half maximum in particle size distribution means the difference between particle sizes corresponding to ½ of the maximum particle size in particle size distribution. As the difference increases, that is, full width at half maximum in particle size distribution increases, the uniformity of rubber particle size increases. In FIG. 1, $f_{max}$ is the maximum particle diameter, 1/2 of the maximum particle diameter is $f_{max/2}$, and particle diameters corresponding to $f_{max/2}$ are $X_1$ and $X_2$, respectively. The range of $X_1$ to $X_2$, that is, FWHM, is full width at half maximum in particle size distribution.

In this description, when full width at half maximum in particle size distribution is measured, capillary hydrodynamic fractionation (CHDF) is measured using MATEC CHDF 400.

For example, the enlarged conjugated diene rubber latex obtained in step (c) may have a coagulum content of 1.2% by weight or less, preferably 0.1% by weight or less, more preferably 0.08% by weight or less, still more preferably 0.07% by weight or less, still more preferably 0.01 to 0.07% by weight. Within this range, impact resistance may be improved, and injection mold deposits may be reduced during injection molding.

d) Step of Graft-Polymerizing 40 to 70% by Weight (Based on Solids) of the Enlarged Conjugated Diene Rubber Latex, 15 to 45% by Weight of an Aromatic Vinyl Compound, and 5 to 25% by Weight of a Vinyl Cyanide Compound to Obtain a Vinyl Cyanide Compound-Conjugated Diene Rubber-Aromatic Vinyl Compound Graft Copolymer In step (d) of obtaining a graft copolymer, 45 to 65% by weight (based on solids) of enlarged conjugated diene rubber latex, 20 to 40% by weight of an aromatic vinyl compound, and 10 to 20% by weight of a vinyl cyanide compound are preferably included and graft-polymerized. More preferably, 50 to 60% by weight (based on solids) of enlarged conjugated diene rubber latex, 25 to 35% by weight of an aromatic vinyl compound, and 12 to 17% by weight of a vinyl cyanide compound are included and graft-polymerized. Within this range, fluidity, reflection haze, gloss, and impact resistance may be excellent, and injection mold deposits may be reduced during injection molding.

Preferably, based on 100 parts by weight in sum of conjugated diene rubber latex (based on solids), an aromatic vinyl compound, and a vinyl cyanide compound, step (d) includes a first graft polymerization step (d-1) of continuously adding, at 65 to 75° C. for 2 to 4 hours, a mixed solution including 15 to 45 parts by weight of an aromatic vinyl compound, 5 to 25 parts by weight of a vinyl cyanide compound, 10 to 30 parts by weight of deionized water, 0.01 to 2 parts by weight of an emulsifier, and 0.01 to 2 parts by weight of a molecular weight regulator, 0.01 to 2 parts by weight of a fat-soluble polymerization initiator, and 0.001 to 0.4 parts by weight of an oxidation-reduction catalyst to 40 to 70 parts by weight (based on solids) of the enlarged conjugated diene rubber latex and 80 to 120 parts by weight of deionized water and performing reaction; step (d-2) of adding, after the first graft polymerization step, 0.001 to 0.6 parts by weight of an oxidation-reduction catalyst and 0.001 to 0.5 parts by weight of a fat-soluble polymerization initiator; a second graft polymerization step (d-3) of performing reaction while raising temperature to 75 to 85° C. for 50 to 70 minutes after adding the oxidation-reduction catalyst and the fat-soluble polymerization initiator; and step (d-4) of terminating polymerization when polymerization conversion rate is 90 to 99% In this case, fluidity, reflection haze, gloss, and impact resistance may be excellent, and injection mold deposits may be reduced during injection molding.

In step (d-1), for example, the emulsifier may be included in an amount of 0.01 to 2 parts by weight, preferably 0.1 to 1.5 parts by weight, more preferably 0.1 to 1 part by weight, still more preferably 0.2 to 0.7 parts by weight. Within this range, latex stability may be excellent, and coagulum content may be reduced.

In step (d-1), for example, the emulsifier may be a multimer acid of unsaturated fatty acids or a metal salt thereof. In this case, latex stability may be excellent, and coagulum content may be reduced.

The multimer acid of unsaturated fatty acids is a polyvalent carboxylic acid obtained by reacting an unsaturated fatty acid having two or more molecules. The unsaturated fatty acid may be a linear, branched, cyclic or complex cyclic unsaturated fatty acid including two or more cycloalkenes, or a derivative thereof. In this case, the coagulum of latex may be reduced, and injection mold deposits may be reduced during injection molding.

In this description, a derivative of a compound refers to a substance obtained by substituting one or more hydrogens of the compound with another type of group such as an alkyl group, a halogen group, or a hydroxyl group.

In this description, the complex cyclic type means including two or more saturated or unsaturated cycloalkyl groups having 5 to 15 carbon atoms in the molecule.

In step (d-1), the molecular weight regulator is preferably included in an amount of 0.05 to 1.5 parts by weight, more preferably 0.1 to 1 part by weight, still more preferably 0.2 to 0.7 parts by weight.

In step (d-1), the oxidation-reduction catalyst is preferably included in an amount of 0.01 to 0.3 parts by weight, more preferably 0.05 to 0.2 parts by weight.

In step (d-1), reaction is preferably performed by continuous feeding components at 67 to 73° C. for 2.5 to 3.5 hours. Within this range, grafting efficiency may be excellent, and latex coagulum may be reduced.

In step (d-2), the oxidation-reduction catalyst is preferably included in an amount of 0.001 to 0.6 parts by weight, more preferably 0.01 to 0.3 parts by weight.

In step (d-2), the fat-soluble polymerization initiator is preferably included in an amount of 0.01 to 0.3 parts by weight, more preferably 0.03 to 0.1 parts by weight.

In step (d-3), reaction is preferably performed by raising temperature to 77 to 82° C. for 55 to 65 minutes. Within this range, reaction efficiency may be excellent, and coagulum content may be reduced.

In step (d-4), when polymerization conversion rate is 93 to 97%, polymerization may be terminated.

For example, the vinyl cyanide compound-conjugated diene rubber-aromatic vinyl compound graft copolymer obtained in step (d-4) may be prepared in the form of latex powder through conventional processes such as coagulation, washing, and drying.

For example, the coagulation may be performed by adding 0.1 to 2 parts by weight, preferably 0.5 to 1.5 parts by weight of an acid coagulant based on 100 parts by weight (based on solids) of the graft copolymer latex.

For example, the acid coagulant may include one or more selected from the group consisting of sulfuric acid, hydrochloric acid, formic acid, and acetic acid, preferably sulfuric acid. In this case, coagulation efficiency may be good, and gloss may be excellent.

For example, the vinyl cyanide compound-conjugated diene rubber-aromatic vinyl compound graft copolymer obtained in step (d) may have a coagulum content of 0.1% by weight or less, preferably 0.09% by weight or less, more preferably 0.01 to 0.09% by weight. Within this range, impact resistance may be improved, and injection mold deposits may be reduced during injection molding.

In this description, when the electrolyte, the acid enlarging agent, or the coagulant includes a solvent such as water, the weight thereof means weight excluding the solvent.

Method of Preparing Thermoplastic Resin Composition

A method of preparing a thermoplastic resin composition according to the present invention may include a step of preparing the vinyl cyanide compound-conjugated diene rubber-aromatic vinyl compound graft copolymer according to the preparation method; and a step of feeding 15 to 35% by weight of the prepared graft copolymer and 65 to 85% by weight of an aromatic vinyl compound-vinyl cyanide compound copolymer into an extruder, performing melt-kneading, and then performing extrusion. In this case, fluidity, reflection haze, and gloss may be excellent. In particular, impact resistance may be excellent, and injection mold deposits may be reduced during injection molding.

The method of preparing a thermoplastic resin composition preferably includes a step of preparing the vinyl cyanide compound-conjugated diene rubber-aromatic vinyl compound graft copolymer according to the preparation method; and a step of feeding 20 to 30% by weight of the prepared graft copolymer and 70 to 80% by weight of an aromatic vinyl compound-vinyl cyanide compound copolymer into an extruder, performing melt-kneading, and then performing extrusion. In this case, fluidity, reflection haze, and gloss may be excellent. In particular, impact resistance may be excellent, and injection mold deposits may be reduced during injection molding.

For example, the melt-kneading and extruding step may be performed at a barrel temperature of 200 to 330° C., preferably 210 to 300° C., more preferably 210 to 280° C., still more preferably 220 to 250° C. In this case, throughput per unit time may be appropriate, and melt-kneading may be sufficiently performed. In addition, thermal decomposition of a resin component may be suppressed.

For example, the melt-kneading and extruding step may be performed at a screw rotation rate of 100 to 500 rpm, preferably 150 to 450 rpm, more preferably 200 to 400 rpm, still more preferably 200 to 350 rpm, most preferably 250 to 350 rpm. In this case, due to adequate throughput per unit time, process efficiency may be excellent, and excessive cutting may be suppressed.

For example, the melt-kneading may be performed using a Banbury mixer, a single-screw extruder, a twin-screw extruder, a kneader or the like, without particular limitation.

When the melt-kneading is performed, when necessary, one or more additives selected from the group consisting of a colorant, a heat stabilizer, a light stabilizer, a reinforcing agent, a filler, a flame retardant, a lubricant, a plasticizer, an antistatic agent, and a processing aid may be added. In this case, based on 100 parts by weight of the thermoplastic resin composition (vinyl cyanide compound-conjugated diene rubber-aromatic vinyl compound graft copolymer +aromatic vinyl compound-vinyl cyanide compound copolymer), each additive may be added in an amount of 0.01 to 10 parts by weight, preferably 0.1 to 5 parts by weight.

For example, the aromatic vinyl compound-vinyl cyanide compound copolymer may include 65 to 85% by weight of an aromatic vinyl compound and 15 to 35% by weight of a vinyl cyanide compound, preferably 70 to 80% by weight of an aromatic vinyl compound and 20 to 30% by weight of a vinyl cyanide compound. Within this range, due to adequate fluidity, processability and impact resistance may be excellent.

For example, the aromatic vinyl compound-vinyl cyanide compound copolymer may have a weight average molecular weight of 120,000 to 200,000 g/mol, preferably 140,000 to 180,000 g/mol. Within this range, due to adequate fluidity, processability and impact resistance may be excellent.

In this description, unless otherwise defined, the weight average molecular weight may be measured using gel permeation chromatography (GPC, Waters Breeze). As a specific example, the weight average molecular weight may be measured using tetrahydrofuran (THF) as an eluate through gel permeation chromatography (GPC, Waters Breeze). In this case, weight average molecular weight is obtained as a relative value to a polystyrene (PS) standard sample. As a specific measurement example, the weight average molecular weight may be measured under conditions of solvent: THF, column temperature: 40° C., flow rate: 0.3 ml/min, sample concentration: 20 mg/ml, injection amount: 5 μl, column model: 1×PLgel 10 μm MiniMix-B (250×4.6 mm)+ 1×PLgel 10 pm MiniMix-B (250×4.6 mm)+1× PLgel 10 μm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

In this description, a polymer including a certain compound means a polymer prepared by polymerizing the compound, and a unit in the polymer is derived from the compound.

For example, the aromatic vinyl compound-vinyl cyanide compound copolymer may be prepared by solution polymerization or bulk polymerization, preferably bulk polymerization. In this case, heat resistance and fluidity may be excellent.

Solution polymerization and bulk polymerization commonly practiced in the art to which the present invention pertains may be used in the present invention without particular limitation.

In this description, for example, the conjugated diene compound may include one or more selected from the group consisting of 1,3-butadiene, 2,3-dimethyl-1,3-butadiene, 2-ethyl-1,3-butadiene, 1,3-pentadiene, and isoprene, preferably 1,3-butadiene.

In this description, for example, the aromatic vinyl compound may include one or more selected from the group consisting of styrene, α-methyl styrene, o-methyl styrene, p-methyl styrene, m-methyl styrene, ethyl styrene, isobutyl styrene, t-butyl styrene, o-bromostyrene, p-bromostyrene, m-bromostyrene, o-chlorostyrene, p-chlorostyrene, m-chlorostyrene, vinyltoluene, vinylxylene, fluorostyrene, and vinylnaphthalene, preferably includes one or more selected from the group consisting of styrene and α-methyl styrene, more preferably styrene. In this case, due to proper fluidity, processability and mechanical properties, such as impact resistance, may be excellent.

In this description, for example, the vinyl cyanide compound may include one or more selected from the group consisting of acrylonitrile, methacrylonitrile, ethylacrylonitrile, and isopropylacrylonitrile, preferably acrylonitrile.

Thermoplastic Resin Composition

For example, a thermoplastic resin composition of the present invention includes 15 to 35% by weight of a vinyl cyanide compound-conjugated diene rubber-aromatic vinyl compound graft copolymer and 65 to 85% by weight of an aromatic vinyl compound-vinyl cyanide compound copolymer, wherein the conjugated diene rubber has an average particle diameter of 2,800 to 3,800 Å and a full width at half maximum of 1,400 to 2,700 Å in particle size distribution, and the thermoplastic resin composition has an Izod impact strength of 40 kgf·cm/cm or more as measured using a specimen having a thickness of ⅛" according to ASTM D256. In this case, impact resistance may be significantly increased, and fluidity, reflection haze, and gloss may be excellent. In addition, during injection molding, injection mold deposits may be reduced The conjugated diene rubber preferably has an average particle diameter of 2,900 to 3,700 Å and a full width at half maximum of 1,500 to 2,700 Å in particle size distribution, more preferably has an average particle diameter of 3,000 to 3,600 Å and a full width at half maximum of 1,600 to 2,600 Å in particle size distribution. Within this range, impact resistance may be significantly improved, fluidity, reflection haze, and gloss may be excellent, and injection mold deposits may be reduced during injection molding.

The thermoplastic resin composition preferably has an Izod impact strength of 41 kgf·cm/cm or more, more preferably 41 to 52 kgf·cm/cm, still more preferably 42 to 49 kgf·cm/cm as measured using a specimen having a thickness of ⅛" according to ASTM D256. Within this range, physical property balance may be excellent.

For example, the thermoplastic resin composition may have an Izod impact strength of 25 kgf·cm/cm or more, preferably 26 kgf·cm/cm or more, more preferably 26 to 33 kgf·cm/cm, still more preferably 27 to 33 kgf·cm/cm as measured using a specimen having a thickness of ¼" according to ASTM D256. Within this range, physical property balance may be excellent.

For example, the thermoplastic resin composition may have a melt index of 24 g/10 min or more, preferably 24 to 30 g/10 min, more preferably 24 to 27 g/10 min as measured at 220° C. under a load of 10 kg for 10 minutes according to ASTM D1238. Within this range, due to excellent fluidity, various shapes may be realized by molding.

For example, the thermoplastic resin composition may have a reflection haze of 1.1 or less, preferably 0.5 to 1.1, more preferably 0.7 to 1.1 as measured using RhopointQ equipment (manufacturer: Rhopoint instruments Co.) according to ASTM E430. Within this range, physical property balance and surface sharpness may be excellent.

For example, the thermoplastic resin composition may have a gloss of 97 or more, preferably 97 to 110, more preferably 100 to 107, still more preferably 101 to 105 as measured at an angle of 45° using a gloss meter according to ASTM D258. Within this range, physical property balance and surface appearance may be excellent.

For example, in the case of the thermoplastic resin composition, when 100 kg of a resin is injected in a cycle of 30 seconds at a cylinder temperature of 230° C. and a mold temperature of 25° C. using an injection machine (ENGEL Co., clamping force: 150 tons), an amount of injection mold deposits remaining on a plate may be 94 mg or less, preferably 93 mg or less, more preferably 83 to 93 mg, still more preferably 85 to 93 mg. Within this range, physical property balance, productivity, and appearance may be excellent.

Pellets are melted in the cylinder of an injection machine set at 230° C., and the melted pellets are ejected into a mold set at 25° C. and harden. At this time, this process takes 30 seconds, which is defined as one cycle.

As another example, in the case of the thermoplastic resin composition, when 100 kg of a resin is injected in a cycle of 30 seconds at an injection machine temperature of 220° C. and a mold temperature of 30° C. using an injection machine (VICTORY, ENGEL Co., clamping force: 150 tons), an amount of injection mold deposits remaining on a plate may be 94 mg or less, preferably 93 mg or less, more preferably 83 to 93 mg, still more preferably 85 to 93 mg. Within this range, physical property balance, productivity, and appearance may be excellent.

Pellets are fed into the barrel of an injection machine set at 220° C. and melted, and the melted pellets are ejected into a mold set at 30° C. and harden. At this time, this process takes 30 seconds, which is defined as one cycle.

When necessary, the thermoplastic resin composition may include one or more additives selected from the group consisting of an antioxidant, a UV stabilizer, a dye, a pigment, a flame retardant, and an inorganic filler. In this case, based on 100 parts by weight of the thermoplastic resin composition (vinyl cyanide compound-conjugated diene rubber-aromatic vinyl compound graft copolymer+aromatic vinyl compound-vinyl cyanide compound copolymer), each additive may be included in an amount of 0.01 to 5 parts by weight, preferably 0.05 to 3 parts by weight, more preferably 0.1 to 2 parts by weight, still more preferably 0.5 to 1 part by weight. Within this range, required physical properties may be efficiently implemented without deterioration in the intrinsic physical properties of the thermoplastic resin composition of the present invention.

The thermoplastic resin composition shares all the technical characteristics of the method of preparing a thermoplastic resin composition described above. Accordingly, repeated description thereof will be omitted.

Molded Article

A molded article of the present invention includes the thermoplastic resin composition. In this case, fluidity, reflection haze, and gloss may be excellent, and impact resistance may be significantly improved, compared to conventional ABS resins. In addition, during injection molding, deposits may be significantly reduced, and thus productivity and product appearance may be excellent.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Example 1

Preparation of Conjugated Diene Rubber Latex 90 parts by weight of deionized water, 30 parts by weight of 100 parts by weight in total of 1,3-butadiene as a conjugated diene compound, 1 part by weight of a fatty acid saponifying agent as an emulsifier, 0.3 parts by weight of $K_2CO_3$ as an electrolyte, 0.15 parts by weight of tert-dodecylmercaptan (TDDM) as a molecular weight regulator, 0.15 parts by weight of tert-butyl hydroperoxide as a fat-soluble initiator, 0.06 parts by weight of dextrose, 0.005 parts by weight of sodium pyrophosphate, and 0.0025 parts by weight of ferrous sulfate as an oxidation-reduction catalyst were fed into a nitrogen-substituted polymerization reactor (autoclave) batchwise, and then reaction temperature was maintained at 55° C. for 1 hours. Then, 70 parts by weight of the remaining 1,3-butadiene and 0.3 parts by weight of tert-dodecylmercaptan (TDDM) as a molecular weight regulator were continuously fed for 10 hours while raising temperature to 78° C. over 9 hours and maintaining temperature at 78° C. Then, when polymerization conversion rate reached 30 to 40%, 0.1 parts by weight of potassium persulfate as a water-soluble initiator and 0.15 parts by weight of a rosin acid emulsifier were additionally fed. Then, when polymerization conversion rate reached 95%, reaction was terminated. At this time, the average particle diameter of conjugated diene rubber latex was 1,180 Å.

Enlarging of Conjugated Diene Rubber Latex 0.1 parts by weight of potassium carbonate ($K_2CO_3$) as an electrolyte was added to 100 parts by weight (based on solids) of the prepared conjugated diene rubber latex, stirring was performed at a stirring speed of 45 to 70 rpm for 10 minutes, and then an aqueous solution including 0.82 parts by weight of an acetic acid as an acid enlarging agent was added thereto to enlarge the conjugated diene rubber latex. At this time, the average particle diameter of the enlarged conjugated diene rubber latex was 3,270 Å.

Polymerization of Vinyl Cyanide Compound-Conjugated Diene Rubber-Aromatic Vinyl Compound Graft Copolymer In a nitrogen-substituted polymerization reactor, a mixed solution including 15 parts by weight of acrylonitrile, parts by weight of styrene, 20 parts by weight of deionized water, 0.4 parts by weight of a dimer acid saponifying agent, and 0.35 parts by weight of tert-dodecylmercaptan mixed in a separate mixing device, 0.12 parts by weight of t-butyl hydroperoxide, 0.054 parts by weight of dextrose, 0.004 parts by weight of sodium pyrophosphate, and 0.002 parts by weight of ferrous sulfate were continuously added to 55 parts by weight (based on solids) of the prepared enlarged conjugated diene rubber latex and 100 parts by weight of deionized water at 70° C. for 3 hours. Then, 0.05 parts by weight of dextrose, 0.03 parts by weight of sodium pyrophosphate, 0.001 parts by weight of ferrous sulfate, and 0.05 parts by weight of t-butyl hydroperoxide were fed into the polymerization reactor batchwise. Then, after raising temperature to 80° C. over 1 hour, reaction was terminated to obtain acrylonitrile-butadiene-styrene (hereinafter referred to as "ABS") latex.

Based on 100 parts by weight (based on solids) of the prepared ABS latex, 1 part by weight of $MgSO_4$ was added to perform coagulation, followed by washing and drying to obtain ABS powder.

<Preparation of thermoplastic resin composition >

25 parts by weight of the obtained ABS powder and 75 parts by weight of a SAN resin (LG Chemical Co., weight average molecular weight: 120,000 g/mol, acrylonitrile content: 27% by weight) were knead and extruded at 210° C. to prepare pellets. The melt index of the prepared pellets was measured. In addition, the prepared pellets were injected at a molding temperature of 220° C. to prepare a specimen for measuring physical properties.

Example 2

The same procedure as in Example 1 was performed, except that, instead of 0.1 parts by weight of potassium carbonate ($K_2CO_3$) as an electrolyte in <enlarging of conjugated diene rubber latex>of Example 1, 0.1 parts by weight of sodium sulfate ($Na_2SO_4$) was added and stirred, and then an aqueous solution including 0.7 parts by weight of acetic acid was added.

Example 3

The same procedure as in Example 1 was performed, except that, instead of 0.1 parts by weight of potassium carbonate ($K_2CO_3$) as an electrolyte in <Enlarging of conjugated diene rubber latex>of Example 1, 0.1 parts by weight of sodium phosphate ($Na_3PO_4$) was added and stirred, and then an aqueous solution including 0.7 parts by weight of acetic acid was added.

Example 4

The same procedure as in Example 1 was performed, except that, instead of 0.1 parts by weight of potassium carbonate ($K_2CO_3$) as an electrolyte in <enlarging of conjugated diene rubber latex>of Example 1, 0.1 parts by weight of sodium monohydrogen phosphate ($Na_2HPO_4$) was added and stirred, and then an aqueous solution including 0.7 parts by weight of acetic acid was added.

Example 5

The same procedure as in Example 1 was performed, except that, instead of 0.1 parts by weight of potassium carbonate ($K_2CO_3$) as an electrolyte in <enlarging of conjugated diene rubber latex>of Example 1, 0.1 parts by weight of sodium dihydrogen phosphate ($NaH_2PO_4$) was added and stirred, and then an aqueous solution including 0.8 parts by weight of acetic acid was added.

Example 6

Preparation of Conjugated Diene Rubber Latex 90 parts by weight of deionized water, 30 parts by weight of 100 parts by weight in total of 1,3-butadiene as a conjugated diene compound, 1 part by weight of a fatty acid saponifying agent as an emulsifier, 0.3 parts by weight of $Na_2SO_4$ as an electrolyte, 0.15 parts by weight of tert-dodecylmercaptan (TDDM) as a molecular weight regulator, 0.15 parts by weight of tert-butyl hydroperoxide as a fat-soluble initiator, 0.06 parts by weight of dextrose, 0.005 parts by weight of sodium pyrophosphate, and 0.0025 parts by weight of ferrous sulfate were fed as an oxidation-reduction catalyst into a nitrogen-substituted polymerization reactor (autoclave) batchwise, and reaction temperature was maintained at 55° C. for 1 hours. Then, 70 parts by weight of the remaining 1,3-butadiene and 0.3 parts by weight of tert-dodecylmercaptan (TDDM) as a molecular weight regulator were continuously fed for 10 hours while raising temperature to 78° C. over 9 hours and maintaining temperature at 78° C. Then, when polymerization conversion rate reached 30 to 40%, 0.1 parts by weight of potassium persulfate as a water-soluble initiator and 0.15 parts by weight of a rosin acid emulsifier were additionally fed. Then, when polymerization conversion rate reached 95%, reaction was terminated. At this time, the average particle diameter of conjugated diene rubber latex was 1,180 Å.

Enlarging of Conjugated Diene Rubber Latex

An aqueous solution including 0.9 parts by weight of acetic acid as an acid enlarging agent was added to 100 parts by weight (based on solids) of the prepared conjugated diene rubber latex to enlarge the conjugated diene rubber latex. At this time, the average particle diameter of the enlarged conjugated diene rubber latex was 3350 Å.

<Polymerization of vinyl cyanide compound-conjugated diene rubber-aromatic vinyl compound graft copolymer >

In a nitrogen-substituted polymerization reactor, a mixed solution including 15 parts by weight of acrylonitrile, parts by weight of styrene, 20 parts by weight of deionized water, 0.4 parts by weight of a dimer acid saponifying agent, and 0.35 parts by weight of tert-dodecylmercaptan mixed in a separate mixing device, 0.12 parts by weight of t-butyl hydroperoxide, 0.054 parts by weight of dextrose, 0.004 parts by weight of sodium pyrophosphate, and 0.002 parts by weight of ferrous sulfate were continuously added to 55 parts by weight (based on solids) of the prepared enlarged conjugated diene rubber latex and 100 parts by weight of deionized water at 70° C. for 3 hours. Then, 0.05 parts by weight of dextrose, 0.03 parts by weight of sodium pyrophosphate, 0.001 parts by weight of ferrous sulfate, and 0.05 parts by weight of t-butyl hydroperoxide were fed into the polymerization reactor batchwise. Then, after raising temperature to 80° C. over 1 hour, reaction was terminated to obtain acrylonitrile-butadiene-styrene (hereinafter referred to as "ABS") latex.

Based on 100 parts by weight (based on solids) of the prepared ABS latex, 1 part by weight of $MgSO_4$ was added to perform coagulation, followed by washing and drying to obtain ABS powder.

Preparation of Thermoplastic Resin Composition 25 parts by weight of the obtained ABS powder and 75 parts by weight of a SAN resin (LG Chemical Co., weight average molecular weight: 120,000 g/mol, acrylonitrile content: 27% by weight) were knead and extruded at 210° C. to prepare pellets. The melt index of the prepared pellets was measured. In addition, the prepared pellets were injected at a molding temperature of 220° C. to prepare a specimen for measuring physical properties.

Example 7

The same procedure as in Example 6 was performed, except that, instead of 0.3 parts by weight of $Na_2SO_4$ as an electrolyte in <Preparation of conjugated diene rubber latex>of Example 6, 0.3 parts by weight of $Na_3PO_4$ was added.

Example 8

The same procedure as in Example 6 was performed, except that, instead of 0.3 parts by weight of $Na_2SO_4$ as an electrolyte in <Preparation of conjugated diene rubber latex>of Example 6, 0.3 parts by weight of $Na_2H_2PO_4$ was added.

Example 9

The same procedure as in Example 6 was performed, except that, instead of 0.3 parts by weight of $Na_2SO_4$ as an electrolyte in <Preparation of conjugated diene rubber latex>of Example 6, 0.3 parts by weight of $Na_2HPO_4$ was added.

Example 10

The same procedure as in Example 6 was performed, except that, instead of 0.3 parts by weight of $Na_2SO_4$ as an electrolyte in <Preparation of conjugated diene rubber latex>of Example 6, 0.2 parts by weight of $Na_2SO_4$ was added.

Example 11

The same procedure as in Example 6 was performed, except that, in <Preparation of conjugated diene rubber latex>of Example 6, 1.5 parts by weight of an emulsifier and 0.2 parts by weight of an electrolyte were added.

Comparative Example 1

Preparation of Conjugated Diene Rubber Latex 75 parts by weight of deionized water, 90 parts by weight of 100 parts by weight in total of 1,3-butadiene as a monomer, 3 parts by weight of a dimer acid saponifying agent as an emulsifier, 0.1 parts by weight of potassium carbonate ($K_2CO_3$) as an electrolyte, 0.1 parts by weight of tert-dodecylmercaptan (TDDM) as a molecular weight regulator, 0.15 parts by weight of tert-butyl hydroperoxide as an initiator, 0.06 parts by weight of dextrose, 0.005 parts by weight of sodium pyrophosphate, and 0.0025 parts by weight of ferrous sulfate were fed into a nitrogen-substituted polymerization reactor (autoclave) batchwise, and reaction was performed at a reaction temperature of 55° C. Then, when polymerization conversion rate reached 30 to 40%, 0.3 parts by weight of potassium persulfate was fed batchwise, and temperature was raised to 72° C. Then, when polymerization conversion rate reached 60 to 70%, 10 parts by weight of the remaining 1,3-butadiene was fed batchwise. Then, when polymerization conversion rate reached 95%, reaction was terminated. At this time, the average particle diameter of the obtained conjugated diene rubber latex was 1,155 Å.

Enlarging of Conjugated Diene Rubber Latex

An aqueous solution including 1.5 parts by weight of acetic acid as an acid enlarging agent was added to 100 parts by weight (based on solids) of the prepared conjugated diene rubber latex to enlarge the conjugated diene rubber latex. At this time, the average particle diameter of the enlarged conjugated diene rubber latex was 3,272 Å.

Polymerization of Vinyl Cyanide Compound-Conjugated Diene Rubber-Aromatic Vinyl Compound Graft Copolymer The same procedure as in <Polymerization of vinyl cyanide compound-conjugated diene rubber-aromatic vinyl compound graft copolymer > of Example 1 was performed.
<Preparation of thermoplastic resin composition >
The same procedure as in <Preparation of thermoplastic resin composition > of Example 1 was performed.

Comparative Example 2

In<Enlarging of conjugated diene rubber latex>of Comparative Example 1, before adding an acid enlarging agent, 0.1 parts by weight of sodium sulfate was added, and then an aqueous solution including 1.37 parts by weight of acetic acid as an acid enlarging agent was added to perform enlarging. At this time, the average particle diameter of the enlarged conjugated diene rubber latex was 3,300 Å.

Comparative Example 3

The same procedure as in Example 1 was performed, except that, instead of 0.1 parts by weight of potassium carbonate ($K_2CO_3$) as an electrolyte in <Enlarging of conjugated diene rubber latex>of Example 1, 0.1 parts by weight of sodium chloride (NaCl) was added, and then an aqueous solution including 0.9 parts by weight of acetic acid as an acid enlarging agent was added to perform enlarging.

Comparative Example 4

The same procedure as in Example 1 was performed, except that, instead of 0.1 parts by weight of potassium carbonate ($K_2CO_3$) as an electrolyte in <Enlarging of conjugated diene rubber latex>of Example 1, 0.1 parts by weight of sodium sulfate was added, and then an aqueous solution including 1.4 parts by weight of acetic acid was added.

Comparative Example 5

To prepare conjugated diene rubber latex, the same procedure as in <Preparation of conjugated diene rubber latex> of Example 1 was performed, except that, instead of continuously feeding 70 parts by weight of the remaining 1,3-butadiene and 0.3 parts by weight of tert-dodecylmercaptan (TDDM) as a molecular weight regulator for 10 hours in <Preparation of conjugated diene rubber latex> of Example 1 the remaining 1,3-butadiene was continuously fed for 10 hours, and 0.15 parts by weight of tert-dodecylmercaptan (TDDM) was fed at 5 hours and 10 hours, respectively.

<Enlarging of conjugated diene rubber latex>

An aqueous solution including 0.9 parts by weight of acetic acid as an acid enlarging agent was added to 100 parts by weight (based on solids) of the prepared conjugated diene rubber latex to enlarge the conjugated diene rubber latex. At this time, the average particle diameter of the enlarged conjugated diene rubber latex was 3,239 Å.

Comparative Example 6

The same procedure as in Example 1 was performed, except that, in <Enlarging of conjugated diene rubber latex> of Example 1, 0.1 parts by weight of potassium carbonate as an electrolyte and an aqueous solution including 0.8 parts by weight of acetic acid as an acid enlarging agent were mixed and fed.

Comparative Example 7

The same procedure as in Example 1 was performed, except that, in <Preparation of conjugated diene rubber latex> of Example 1, 3 parts by weight of an emulsifier was added.

Comparative Example 8

<Preparation of conjugated diene rubber latex>

75 parts by weight of deionized water, 90 parts by weight of 100 parts by weight in total of 1,3-butadiene as a monomer, 3 parts by weight of a dimer acid saponifying agent as an emulsifier, 0.1 parts by weight of potassium carbonate ($K_2CO_3$) as an electrolyte, 0.1 parts by weight of tert-dodecylmercaptan (TDDM) as a molecular weight regulator, 0.15 parts by weight of tert-butyl hydroperoxide as an initiator, 0.06 parts by weight of dextrose, 0.005 parts by weight of sodium pyrophosphate, and 0.0025 parts by weight of ferrous sulfate were fed into a nitrogen-substituted polymerization reactor (autoclave) batchwise, and reaction was performed at a reaction temperature of 55° C. Then, when polymerization conversion rate reached 30 to 40%, 0.3 parts by weight of potassium persulfate was fed batchwise, and then temperature was raised to 72° C. Then, when polymerization conversion rate reached 60 to 70%, 10 parts by weight of the remaining 1,3-butadiene was fed batchwise. Then, when polymerization conversion rate reached 95%, reaction was terminated. At this time, the average particle diameter of the obtained conjugated diene rubber latex was 1155 Å.

Enlarging of Conjugated Diene Rubber Latex

An aqueous solution including 1.5 parts by weight of acetic acid as an acid enlarging agent was added to 100 parts by weight (based on solids) of the prepared conjugated diene rubber latex to enlarge the conjugated diene rubber latex. At this time, the average particle diameter of the enlarged conjugated diene rubber latex was 3,272 Å.

Polymerization of Vinyl Cyanide Compound-Conjugated Diene Rubber-Aromatic Vinyl Compound Graft Copolymer The same procedure as in <Polymerization of vinyl cyanide compound-conjugated diene rubber-aromatic vinyl compound graft copolymer > of Example 6 was performed.

Preparation of Thermoplastic Resin Composition

The same procedure as in <Preparation of thermoplastic resin composition > of Example 6 was performed.

Comparative Example 9

The same procedure as in Example 6 was performed, except that, instead of 0.3 parts by weight of $Na_2SO_4$ as an electrolyte in <Preparation of conjugated diene rubber latex>of Example 6, 0.3 parts by weight of NaCl was added.

Comparative Example 10

The same procedure as in Comparative Example 8 was performed, except that, in <Preparation of conjugated diene rubber latex>of Comparative Example 8, 0.2 parts by weight of tert-dodecylmercaptan (TDDM) as a molecular weight regulator was added at a polymerization conversion rate of 30 to 40% and a polymerization conversion rate of 60 to 70%, respectively.

Comparative Example 11

The same procedure as in Example 6 was performed, except that, in <Preparation of conjugated diene rubber latex>of Example 6, 3.0 parts by weight of an emulsifier was added.

Comparative Example 12

The same procedure as in Example 6 was performed, except that, instead of 0.3 parts by weight of $Na_2SO_4$ as an electrolyte in <Preparation of conjugated diene rubber latex>of Example 6, 0.5 parts by weight of $Na_2SO_4$ was added.

Test Examples

The properties of the pellets and the specimens prepared in Examples 1 to 11 and Comparative Examples 1 to 12 were measured according to the following methods, and the results are shown in Tables 1 to 4 below.

* Average particle diameter (A): Average particle diameter was measured by dynamic light scattering, and specifically, was measured as an intensity value using a Nicomp 380 particle size analyzer (manufacturer: PSS) in a Gaussian mode. As a specific measurement example, a sample was prepared by diluting 0.1 g of latex (TSC: 35 to 50 wt %) 1,000 to 5,000-fold with distilled water, i.e., a sample was diluted appropriately so as not to deviate significantly from an intensity setpoint of 300 kHz, and was placed in a glass tube. Then, the average particle diameter of the sample was measured using a flow cell in auto-dilution in a measurement mode of dynamic light scattering/intensity 300 kHz/intensity-weight Gaussian analysis. At this time, setting values were as follows: temperature: 23° C.; measurement wavelength: 632.8 nm; and channel width: 10 psec.

* Full width at half maximum in particle size distribution (A): Capillary hydrodynamic fractionation (CHDF) was measured using ATEC CHDF 400.

* Gel content (% by weight): After rubber latex was coagulated using a dilute acid or a metal salt, the rubber latex was washed and dried in a vacuum oven at 60° C. for 24 hours. Then, the obtained rubber mass was chopped with scissors. Then, 1 g of rubber sections was placed in 100 g of toluene and placed in a dark room at room temperature for 48 hours. Then, the rubber was separated into a sol and a gel, and the gel content was calculated according to Equation 3 below Equation 3

Gel content (% by weight)=[Weight of insoluble matter (gel)/Weight of sample]×100

* Coagulum content (% by weight): After polymerization was completed, latex was filtered through a stainless steel mesh of 100 mesh size, and unfiltered coagulum was dried at 80° C. for 24 hours. After drying, the weight of the coagulum was measured. Then, the coagulum content was calculated as a percentage based on the total solids content.

* Melt index (g/10 min): The melt index of the prepared pellets was measured under conditions of 220° C. and 10 kg according to ASTM D1238.

* Izod impact strength (IMP; kgf·cm/cm): The Izod impact strength of a ¼" thick specimen and a ⅛" thick specimen was measured respectively according to ASTM D256.

* Gloss: Gloss was measured at 45° according to ASTM D528.

* Reflection haze: Reflection haze was measured by adding gloss values between 17 to 19° and 21 to 23° using RhopointQ equipment (Rhopoint instruments Co.) according to ASTM E430. As reflection haze decreases, surface quality increases.

* Injection mold deposits (mg): Condition A—100 kg of a resin was injected in a cycle of 30 seconds at a cylinder temperature of 230° C. and a mold temperature of 25° C. using an injection machine (ENGEL Co., clamping force: 150 tons), and then the weight of injection deposits remaining in a plate was measured.

* Injection mold deposits (mg): Condition B—100 kg of a resin was injected in a cycle of 30 seconds at an injection machine temperature of 220° C. and a mold temperature of 30° C. using an injection machine (VICTORY, ENGEL Co., clamping force: 150 tons), and then the weight of injection deposits remaining in a plate was measured.

TABLE 1

| Classification | | Example 1 | Example 2 | Example 3 | Example 4 | Example 5 |
|---|---|---|---|---|---|---|
| Conjugated diene Rubber latex | Electrolyte | $K_2CO_3$ | $K_2CO_3$ | $K_2CO_3$ | $K_2CO_3$ | $K_2CO_3$ |
| | (parts by weight) | 0.3 | 0.3 | 0.3 | 0.3 | 0.3 |
| | Emulsifier | 1.0 | 1.0 | 1.0 | 1.0 | 1.0 |
| | Average particle diameter | 1180 | 1180 | 1180 | 1180 | 1180 |
| | Coagulum content | 0.32 | 0.32 | 0.32 | 0.32 | 0.32 |
| | Gel content (% by weight) | 75 | 75 | 75 | 75 | 75 |
| Enlarged conjugated diene rubber latex | Electrolyte | $K_2CO_3$ | $Na_2SO_4$ | $Na_3PO_4$ | $Na_2HPO_4$ | $NaH_2PO_4$ |
| | (parts by weight) | 0.1 | 0.1 | 0.1 | 0.1 | 0.1 |
| | Acetic acid (parts by weight) | 0.82 | 0.7 | 0.7 | 0.7 | 0.8 |
| | Coagulum content | 0.06 | 0.05 | 1.12 | 0.04 | 0.05 |
| | Average particle diameter | 3270 | 3320 | 3392 | 3310 | 3265 |
| | Full width at half maximum in particle size | 1650 | 2420 | 2202 | 2380 | 1720 |
| ABS resin | Coagulum content | 0.05 | 0.03 | 0.03 | 0.03 | 0.09 |
| Thermoplastic resin composition | ¼" impact strength | 26.4 | 28.7 | 27.4 | 28.9 | 26.6 |
| | ⅛" impact strength | 42.2 | 46.8 | 44.1 | 46.3 | 42.7 |
| | Melt index | 24.7 | 25.2 | 24.3 | 24.9 | 25.3 |
| | Reflection haze | 1.1 | 0.9 | 1.0 | 1.1 | 0.9 |

TABLE 1-continued

| Classification | | Example 1 | Example 2 | Example 3 | Example 4 | Example 5 |
|---|---|---|---|---|---|---|
| | Gloss | 97 | 102 | 101 | 103 | 101 |
| | Injection mold deposits (condition A) | 92 | 88 | 93 | 90 | 92 |

TABLE 2

| Classification | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Conjugated diene rubber latex | Electrolyte (parts by weight) | $K_2CO_3$ 0.1 | $K_2CO_3$ 0.1 | $K_2CO_3$ 0.3 | $K_2CO_3$ 0.3 | $K_2CO_3$ 0.3 | $K_2CO_3$ 0.3 | $K_2CO_3$ 0.3 |
| | Emulsifier (parts by weight) | 3 | 3 | 1.0 | 1.0 | 1.0 | 1.0 | 3 |
| | Average particle diameter | 1155 | 1155 | 1180 | 1090 | 1130 | 1180 | 1110 |
| | Coagulum content | 0.31 | 0.31 | 0.32 | 0.32 | 0.33 | 0.32 | 0.28 |
| | Gel content (% by weight) | 90 | 90 | 75 | 76 | 86 | 75 | 77 |
| Enlarged conjugated diene rubber latex | Electrolyte (parts by weight) | — | $Na_2SO_4$ 0.1 | NaCl 0.1 | $Na_2SO_4$ 0.1 | — | $K_2CO_3$ 0.1 + acetic acid 0.82 | $K_2CO_3$ 0.1 |
| | Acetic acid (parts by weight) | 1.5 | 1.37 | 0.9 | 1.4 | 0.9 | | 1.0 |
| | Coagulum content | 0.06 | 0.07 | 0.06 | 0.06 | 0.04 | 0.12 | 0.11 |
| | Average particle diameter | 3272 | 3300 | 3218 | 3195 | 3239 | 3273 | 3320 |
| | Full width at half maximum in particle size | 620 | 2256 | 585 | 2156 | 621 | 1282 | 1210 |
| ABS resin | Coagulum content | 0.04 | 0.06 | 0.1 | 0.07 | 0.03 | 0.08 | 0.07 |
| Thermoplastic resin composition | ¼" impact strength | 23 | 24.1 | 24.9 | 22.5 | 24.6 | 24.3 | 24.1 |
| | ⅛" impact strength | 34.2 | 38.3 | 35.2 | 32.6 | 35.5 | 36.6 | 38.8 |
| | Melt index | 23.2 | 23.6 | 25.0 | 23.7 | 24.1 | 24.1 | 24.0 |
| | Reflection haze | 1.5 | 1.6 | 1.0 | 1.3 | 1.1 | 1.3 | 1.2 |
| | Gloss | 98 | 100 | 100 | 102 | 96 | 98 | 97 |
| | Injection mold deposits (condition A) | 148 | 149 | 97 | 148 | 102 | 142 | 140 |

As shown in Tables 1 and 2, in the case of the thermoplastic resin compositions (Examples 1 to 5) according to the present invention, compared to Comparative Examples 1 to 6, fluidity, reflection haze, and gloss were excellent, impact strength was significantly increased at ¼" specimen thickness and ⅛" specimen thickness, and injection mold deposits were reduced. As a notable result, in the case of Examples 1 to 5 in which $K_2CO_3$, $Na_2SC_4$, $Na_3PC_4$, or $NaH_2PC_4$ as an electrolyte was added before enlarging conjugated diene rubber latex using an acid enlarging agent, compared to Comparative Example 1 according to a conventional method, enlarged conjugated diene rubber latex had an expanded full width at half maximum in particle size distribution, thereby significantly increasing impact strength, in particular, in ⅛" thickness.

In addition, in the case of Comparative Examples 1 and 2 in which 3 parts by weight of an emulsifier was added during polymerization of conjugated diene rubber latex according to a conventional method, and a molecular weight regulator was added in a manner different from the present invention, full width at half maximum in particle size distribution was very narrow, impact strength, reflection haze, and gloss were poor, and injection mold deposits were significantly increased.

In addition, in the case of Comparative Example 3 in which full width at half maximum in particle size distribution was outside the range of the present invention, and NaCl as an electrolyte was added before adding an acid enlarging agent, the coagulum content of an ABS resin was greatly increased, impact strength was poor, and injection mold deposits were increased.

In addition, in the case of Comparative Example 4 in which 1.4 parts by weight of an acid enlarging agent was added, impact strength, reflection haze, and gloss were poor, and injection mold deposits were significantly increased. In the case of Comparative Example 5 in which a molecular weight regulator was added in a manner different from the present invention, the gel content of rubber latex was increased, full width at half maximum in particle size distribution was narrow, impact strength, reflection haze, and gloss were poor, and injection mold deposits were increased.

In addition, in the case of Comparative Example 6 in which an electrolyte and an acid enlarging agent were mixed and added in <Enlarging of conjugated diene rubber latex>, full width at half maximum in particle size distribution was narrow, impact strength, reflection haze, and gloss were poor, and injection mold deposits were increased.

In addition, in the case of Comparative Example 7 in which an emulsifier was used in an amount exceeding the range of the present invention in <Preparation of conjugated diene rubber latex>, full width at half maximum in particle size distribution was narrow, impact strength, reflection haze, and gloss were poor, and injection mold deposits were increased.

TABLE 3

| Classification | | Example 6 | Example 7 | Example 8 | Example 9 | Example 10 | Example 11 |
|---|---|---|---|---|---|---|---|
| Conjugated diene rubber latex | Electrolyte (parts by weight) | $Na_2SO_4$ 0.3 | $Na_3PO_4$ 0.3 | $NaH_2PO_4$ 0.3 | $Na_2HPO_4$ 0.3 | $Na_2SO_4$ 0.2 | $Na_2SO_4$ 0.2 |
| | step (a) Emulsifier (parts by weight) | 1.0 | 1.0 | 1.0 | 1.0 | 1.0 | 1.5 |
| | Average particle diameter | 1175 | 1140 | 1180 | 1180 | 1195 | 1165 |
| | Coagulum content | 0.3 | 0.3 | 0.3 | 0.3 | 0.3 | 0.3 |
| | Gel content (% by weight) | 76 | 76 | 77 | 75 | 77 | 76 |
| Enlarged conjugated diene rubber latex | Acetic acid (parts by weight) | 0.7 | 0.7 | 0.7 | 0.7 | 0.7 | 0.7 |
| | Coagulum content | 0.05 | 0.07 | 0.04 | 0.05 | 0.05 | 0.05 |
| | Average particle diameter | 3350 | 3412 | 3375 | 3360 | 3320 | 3300 |
| | Full width at half maximum in particle size | 2530 | 2400 | 2580 | 2220 | 2440 | 2400 |
| ABS resin | Coagulum content | 0.03 | 0.03 | 0.03 | 0.03 | 0.03 | 0.03 |
| Thermoplastic resin composition | ¼" impact strength | 29.7 | 30.2 | 29.5 | 28.4 | 29.5 | 29.4 |
| | ⅛" impact strength | 48.7 | 46.0 | 45.5 | 45.1 | 48.5 | 48.0 |
| | Melt index | 25.3 | 24.4 | 25.0 | 25.0 | 25.3 | 25.5 |
| | Reflection haze | 0.9 | 1.1 | 1.1 | 1.0 | 1.0 | 1.1 |
| | Gloss | 101 | 101 | 101 | 102 | 100 | 100 |
| | Injection mold deposits (condition B) | 90 | 92 | 92 | 92 | 90 | 92 |

TABLE 4

| Classification | | Comparative Example 8 | Comparative Example 9 | Comparative Example 10 | Comparative Example 11 | Comparative Example 12 |
|---|---|---|---|---|---|---|
| Conjugated diene rubber latex | Electrolyte | $Na_2SO_4$ | NaCl | $K_2CO_3$ | $Na_2SO_4$ | $Na_2SO_4$ |
| | (parts by weight) | 0.1 | 0.3 | 0.1 | 0.3 | 0.5 |
| | step (a) Emulsifier (parts by weight) | 3.0 | 1.0 | 3.0 | 3.0 | 1.0 |
| | Average particle diameter | 1155 | 1140 | 1090 | 1010 | 1185 |
| | Coagulum content | 0.3 | 0.3 | 0.3 | 0.2 | 1.1 |
| | Gel content (% by weight) | 93 | 75 | 80 | 91 | 77 |
| Enlarged conjugated diene rubber latex | Acetic acid (parts by weight) | 1.5 | 0.9 | 1.5 | 1.5 | 0.9 |
| | Coagulum content | 0.06 | 0.06 | 0.06 | 0.05 | 0.25 |
| | Average particle diameter | 3272 | 3238 | 3225 | 3250 | 3370 |
| | Full width at half maximum in particle size | 620 | 620 | 1110 | 2210 | 2750 |
| ABS resin | Coagulum content | 0.04 | 0.05 | 0.05 | 0.05 | 0.15 |
| Thermoplastic resin composition | ¼" impact strength | 23 | 25.1 | 25.0 | 26.5 | 28.1 |
| | ⅛" impact strength | 34.2 | 35.4 | 35.5 | 43.1 | 47.1 |
| | Melt index | 23.2 | 25.0 | 25.0 | 25.1 | 25.5 |
| | Reflection haze | 1.5 | 1.1 | 1.3 | 1.2 | 1.1 |
| | Gloss | 98 | 100 | 98 | 97 | 96 |
| | Injection mold deposits (condition B) | 148 | 95 | 152 | 151 | 95 |

As shown in Tables 3 and 4, in the case of the thermoplastic resin compositions (Examples 6 to 11) according to the present invention, compared to Comparative Examples 8 to 12, fluidity, reflection haze, and gloss were excellent, impact strength was significantly increased at ¼" specimen thickness and ⅛" specimen thickness, and injection mold deposits were reduced.

In addition, in the case of Comparative Examples 8 and 10 in which 3 parts by weight of an emulsifier was added according to a conventional method, and a molecular weight regulator was added in a manner different from the present invention, full width at half maximum in particle size distribution was narrow, impact strength and reflection haze were poor, and injection mold deposits were significantly increased.

In addition, in the case of Comparative Example 9 in which full width at half maximum in particle size distribution was less than the range of the present invention, and NaCl as an electrolyte was added, impact strength and reflection haze were poor, and injection mold deposits were increased.

In addition, in the case of Comparative Example 11 in which 3 parts by weight of an emulsifier and 1.5 parts by weight of an acid enlarging agent were added, impact strength and reflection haze were poor, and injection mold deposits were significantly increased.

In addition, in the case of Comparative Example 12 in which 0.5 parts by weight of an electrolyte was added, reflection haze and gloss were poor, and injection mold deposits were increased.

The invention claimed is:

1. A method of preparing a vinyl cyanide compound-conjugated diene rubber-aromatic vinyl compound graft copolymer, comprising:
    step (a) comprising adding 0.1 to 2 parts by weight of an emulsifier, 0.1 to 0.4 parts by weight of an electrolyte, and a molecular weight regulator to 20 to 40 parts by weight of 100 parts by weight in total of a conjugated diene compound and performing polymerization;
    step (b) comprising adding, after step (a), the remaining conjugated diene compound and a molecular weight regulator and performing polymerization to obtain conjugated diene rubber latex;
    step (c) comprising preparing enlarged conjugated diene rubber latex by adding 0.3 to 1.1 parts by weight of an acid enlarging agent to 100 parts by weight of the conjugated diene rubber latex based on solids to enlarge the conjugated diene rubber latex; and
    step (d) comprising graft-polymerizing 40 to 70% by weight of the enlarged conjugated diene rubber latex based on solids, 15 to 45% by weight of an aromatic vinyl compound, and 5 to 25% by weight of a vinyl cyanide compound to obtain a vinyl cyanide compound-conjugated diene rubber-aromatic vinyl compound graft copolymer, wherein the enlarged conjugated diene rubber latex obtained in step (c) has an average particle diameter of 2,800 to 3,800 Å and a full width at half maximum of 1,400 to 2,700 Å in particle size distribution.

2. The method according to claim 1, comprising adding, after step (b), 0.05 to 0.2 parts by weight of an electrolyte to 100 parts by weight of the conjugated diene rubber latex based on solids.

3. The method according to claim 1, wherein the electrolyte comprises one or more selected from the group consisting of $K_2CO_3$, $Na_2SO_4$, $Na_3PO_4$, $NaH_2PO_4$, and $Na_2HPO_4$.

4. The method according to claim 1, wherein in steps (a) and (b), the molecular weight regulator is comprised in an amount of 0.05 to 0.3 parts by weight and 0.05 to 0.5 parts by weight, respectively.

5. The method according to claim 1, wherein in step (a), polymerization is performed at 50 to 60° C. for 50 to 70 minutes.

6. The method according to claim 1, wherein in step (b), the remaining conjugated diene compound and the molecular weight regulator are continuously added for 9 to 11 hours, and temperature is raised to 73 to 83° C. over 8 to 10 hours and maintained at 73 to 83° C.

7. The method according to claim 1, wherein step (b) comprises step (b-1) comprising continuously adding the remaining conjugated diene compound and the molecular weight regulator for 9 to 11 hours, raising temperature to 73 to 83° C. over 8 to 10 hours, and maintaining the temperature to perform polymerization;

step (b-2) comprising adding 0.05 to 0.2 parts by weight of an initiator and 0.05 to 0.3 parts by weight of an emulsifier when polymerization conversion rate is 30 to 40% and performing polymerization; and step (b-3) comprising terminating polymerization when polymerization conversion rate is 93 to 99%.

8. The method according to claim 1, wherein the conjugated diene rubber latex obtained in step (b) has a gel content of 80% by weight or less.

9. The method according to claim 1, wherein step (d) comprises a first graft polymerization step (d-1) comprising continuously adding a mixed solution comprising 15 to 45 parts by weight of an aromatic vinyl compound, 5 to 25 parts by weight of a vinyl cyanide compound, 10 to 30 parts by weight of deionized water, 0.01 to 2 parts by weight of an emulsifier, and 0.01 to 2 parts by weight of a molecular weight regulator, 0.01 to 2 parts by weight of a fat-soluble polymerization initiator, and 0.001 to 0.4 parts by weight of an oxidation-reduction catalyst to 40 to 70 parts by weight of the enlarged conjugated diene rubber latex based on solids and 80 to 120 parts by weight of deionized water at 65 to 75° C. for 2 to 4 hours, and performing reaction, wherein the sum of conjugated diene rubber latex based on solids, the aromatic vinyl compound, and the vinyl cyanide compound is based on 100 parts by weight; wherein step (d) further comprises step (d-2) comprising adding, after the first graft polymerization step, 0.001 to 0.6 parts by weight of an oxidation-reduction catalyst and 0.001 to 0.5 parts by weight of a fat-soluble polymerization initiator; a wherein step (d) further comprises a second graft polymerization step (d-3) comprising performing reaction while raising temperature to 75 to 85° C. for 50 to 70 minutes after adding the oxidation-reduction catalyst and the fat-soluble polymerization initiator; and wherein step (d) further comprises step (d-4) comprising terminating polymerization when polymerization conversion rate is 90 to 99%.

* * * * *